United States Patent
Nakazawa et al.

(10) Patent No.: US 8,679,305 B2
(45) Date of Patent: Mar. 25, 2014

(54) HIGH-PRESSURE HYDROGEN PRODUCING APPARATUS

(75) Inventors: Koji Nakazawa, Wako (JP); Hiroyuki Ishikawa, Wako (JP); Yuji Yamakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/364,320

(22) Filed: Feb. 2, 2012

(65) Prior Publication Data

US 2012/0217156 A1 Aug. 30, 2012

(30) Foreign Application Priority Data

Feb. 28, 2011 (JP) ................ 2011-041052

(51) Int. Cl.
- *C25B 9/00* (2006.01)
- *C25B 1/02* (2006.01)
- *C25B 1/04* (2006.01)

(52) U.S. Cl.
USPC ........ 204/278; 204/194; 204/229.7; 204/266; 204/258; 205/628

(58) Field of Classification Search
USPC ................ 204/242, 258
See application file for complete search history.

(56) References Cited

U.S. PATENT DOCUMENTS

| 7,879,207 B2 | 2/2011 | Dalton et al. |
| 2006/0254907 A1* | 11/2006 | Taruya et al. ............ 204/266 |
| 2009/0242043 A1* | 10/2009 | Lev et al. ............ 137/505.25 |

FOREIGN PATENT DOCUMENTS

JP 2003-160891 6/2003

* cited by examiner

*Primary Examiner* — Harry D Wilkins, III
*Assistant Examiner* — Zulmariam Mendez
(74) *Attorney, Agent, or Firm* — Ditthavong Mori & Steiner, P.C.

(57) ABSTRACT

A high-pressure hydrogen producing apparatus includes a cell device and a piston member. The piston member is to apply a pressing force to the cell device from an end of the piston member in a stacking direction in which unit cells are stacked. The piston member is provided with a first hydrogen passage, at least one second hydrogen passage, and a hydrogen lead-out passage. The first hydrogen passage and the second hydrogen passage are spaced at substantially equal angular intervals on a virtual circle centered on a center of an end face of the piston member.

11 Claims, 4 Drawing Sheets

BACKGROUND ART

HIGH-PRESSURE HYDROGEN PRODUCING APPARATUS

CROSS-REFERENCE TO RELATED APPLICATIONS

The present application claims priority under 35 U.S.C. §119 to Japanese Patent Application No. 2011-041052, filed Feb. 28, 2011, entitled "High-Pressure Hydrogen Producing Apparatus". The contents of this application are incorporated herein by reference in their entirety.

BACKGROUND OF THE INVENTION

1. Field of the Invention

The present invention relates to a high-pressure hydrogen producing apparatus.

2. Discussion of the Background

Generally, hydrogen is used as a fuel gas for power generating reactions in fuel cells. The hydrogen is generated, for example, by a water electrolysis apparatus. For decomposing water to generate hydrogen (and oxygen), the water electrolysis apparatus uses a solid polymer electrolyte membrane (ion-exchange membrane). The solid polymer electrolyte membrane is provided with electrode catalyst layers on both sides thereof to form an electrolyte membrane-electrode assembly, which is provided with current collectors on both sides thereof to form a unit cell.

A cell unit is formed by stacking a plurality of unit cells. A voltage is applied to both ends of the cell unit in the stacking direction while water is supplied to each current collector on the anode side. Thus, on the anode side of the electrolyte membrane-electrode assembly, the water is split to form hydrogen ions (protons), which pass through the solid polymer electrolyte membrane to the cathode side to combine with electrons to generate hydrogen. On the anode side, oxygen produced together with hydrogen ions is discharged with excess water from the cell unit.

As a facility of this type, a clamping apparatus in a solid polymer water electrolysis cell disclosed in Japanese Unexamined Patent Application Publication No. 2003-160891 is known. As illustrated in FIG. 5, a clamping apparatus 1 uniformly clamps a combination of an anode main electrode 2a, a plurality of unit cells 3, and a cathode main electrode 2b with a flange 4 on one side and a compression mechanism 5 on the other side.

The compression mechanism 5 includes a cylinder 6 having an inlet nozzle 6a and an outlet nozzle 6b for compression fluid, and a piston 8 disposed inside the cylinder 6 with O-rings 7 therebetween.

Japanese Unexamined Patent Application Publication No. 2003-160891 states that when the solid polymer water electrolysis cell is operated under any operating pressure or when the operating pressure is desired to be changed to any value, it is possible to carry out the operation under constant relative clamping pressure and easily achieve stable electrolysis performance regardless of the operating pressure or the change in pressure.

SUMMARY OF THE INVENTION

According to one aspect of the present invention, a high-pressure hydrogen producing apparatus includes a cell device and a piston member. The cell device is provided by stacking a plurality of unit cells. Each of the plurality of unit cells includes an electrolyte membrane, a first current collector, a second current collector, a first separator, a second separator, a water flow path, and a hydrogen flow path. The first and second current collectors are disposed on both sides of the electrolyte membrane. The first separator is disposed on the first current collector. The second separator is disposed on the second current collector. The water flow path is provided between the first current collector and the first separator to supply water. The hydrogen flow path is provided between the second current collector and the second separator to provide hydrogen which is generated by electrolyzing the water and which has a pressure higher than a pressure of the water. The piston member is to apply a pressing force to the cell device from an end of the piston member in a stacking direction in which the unit cells are stacked. The hydrogen communication hole extends in the stacking direction of the unit cells, communicates with the hydrogen flow path, and allows the hydrogen to flow in the stacking direction. The piston member is provided with a first hydrogen passage which opens at an end face of the piston member facing the cell device and which communicates with the hydrogen communication hole, at least one second hydrogen passage which communicates with the first hydrogen passage and which opens at the end face, and a hydrogen lead-out passage which communicates with the first hydrogen passage and the second hydrogen passage and which leads the hydrogen out of the high-pressure hydrogen producing apparatus. The first hydrogen passage and the second hydrogen passage are spaced at substantially equal angular intervals on a virtual circle centered on a center of the end face of the piston member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
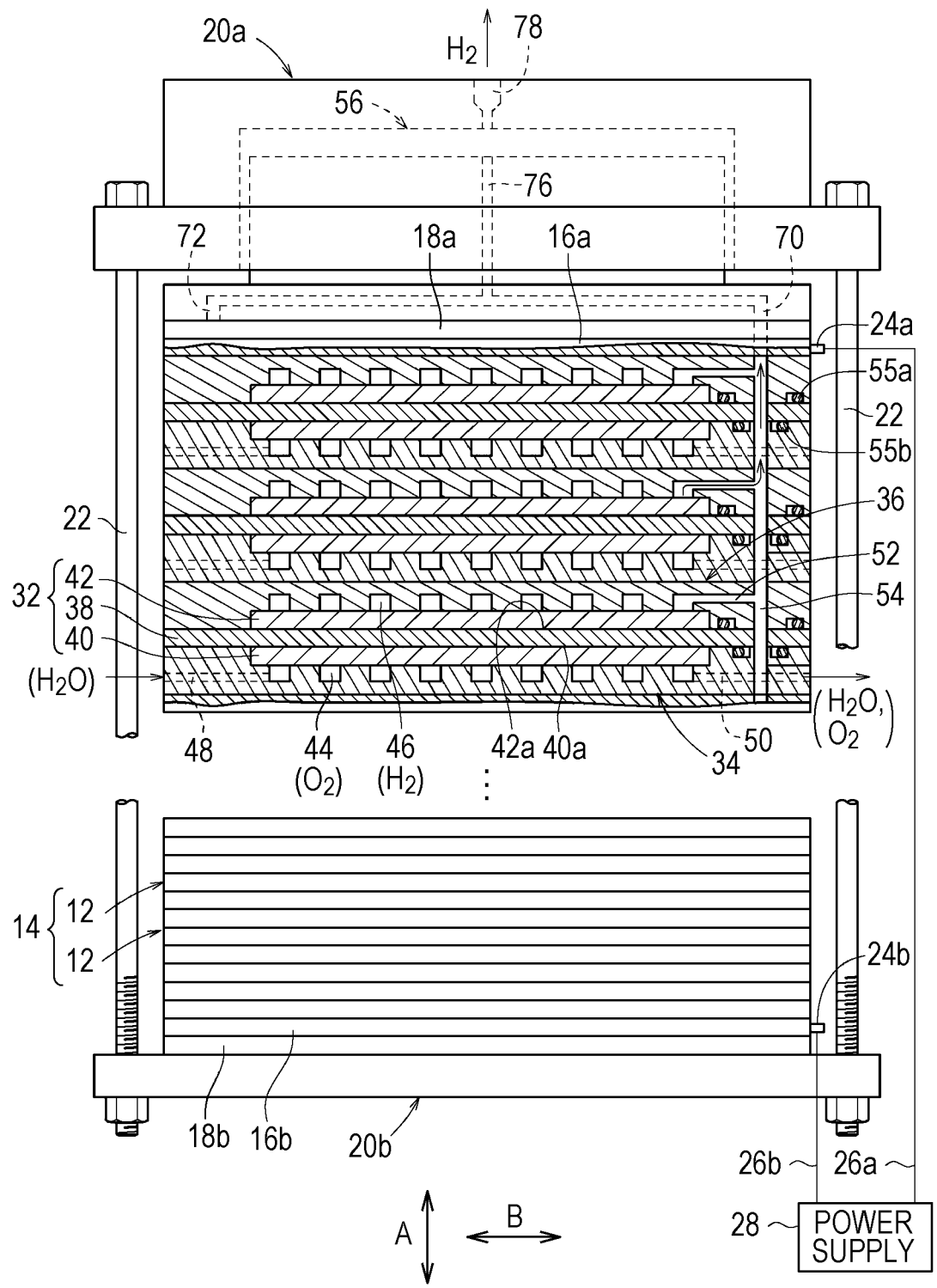
FIG. 1 is a partial cross-sectional side view of a water electrolysis apparatus according to a first embodiment of the present invention.

The embodiments will now be described with reference to the accompanying drawings, wherein like reference numerals designate corresponding or identical elements throughout the various drawings.

As illustrated in FIG. 1, a water electrolysis apparatus 10 according to a first embodiment of the present invention is a high-pressure hydrogen producing apparatus of differential pressure type. The water electrolysis apparatus 10 includes a cell unit 14 formed by stacking a plurality of unit cells 12 in the vertical direction (in the direction of arrow A) or in the horizontal direction (in the direction of arrow B).

A terminal plate 16a, an insulating plate 18a, and an end plate 20a are sequentially disposed at one end of the cell unit 14 in the stacking direction. Similarly, a terminal plate 16b, an insulating plate 18b, and an end plate 20b are sequentially disposed at the other end of the cell unit 14 in the stacking direction.

In the water electrolysis apparatus 10, for example, components between the end plates 20a and 20b having a disk shape are clamped together, with a plurality of tie rods 22 extending in the direction of arrow A interposed between the end plates 20a and 20b. Alternatively, the components between the end plates 20a and 20b may be held together in a box-like casing (not shown) having the end plates 20a and 20b as its parts. Although the water electrolysis apparatus 10 is substantially circular cylindrical in overall shape, it may be cubic or of other shapes.

The terminal plates 16a and 16b are provided with terminals 24a and 24b, respectively, protruding outward from their sides. The terminals 24a and 24b are electrically connected through wires 26a and 26b, respectively, to a power supply 28. The terminal 24b on the anode side is connected to the positive electrode of the power supply 28, and the terminal 24a on the cathode side is connected to the negative electrode of the power supply 28.

Each of the unit cells 12 includes a disk-shaped electrolyte membrane-electrode assembly 32, an anode-side separator 34, and a cathode-side separator 36. The electrolyte membrane-electrode assembly 32 is held between the anode-side separator 34 and the cathode-side separator 36.

The anode-side separator 34 and the cathode-side separator 36 are disk-shaped. For example, the anode-side separator 34 and the cathode-side separator 36 are carbon members, or are generated by press-molding a steel plate, a stainless steel plate, a titanium plate, an aluminum plate, a plated steel plate, or any of these metal plates with a corrosion-resistant coating thereon. The anode-side separator 34 and the cathode-side separator 36 may be produced by cutting any of these metal plates and applying an anti-corrosive coating to the surface after the cutting.

The electrolyte membrane-electrode assembly 32 includes a solid polymer electrolyte membrane 38, and an anode-side current collector 40 and a cathode-side current collector 42 disposed on both sides of the solid polymer electrolyte membrane 38. The solid polymer electrolyte membrane 38 is, for example, a thin perfluorosulfonic acid membrane impregnated with water.

The solid polymer electrolyte membrane 38 is provided with an anode electrode catalyst layer 40a and a cathode electrode catalyst layer 42a on both sides thereof. For example, the anode electrode catalyst layer 40a contains a ruthenium (Ru)-based catalyst, whereas the cathode electrode catalyst layer 42a contains a platinum catalyst.

The anode-side current collector 40 and the cathode-side current collector 42 are, for example, sintered bodies of spherical atomized titanium powder (porous conductors). The anode-side current collector 40 and the cathode-side current collector 42 have smooth surface portions to be etched after grinding. The anode-side current collector 40 and the cathode-side current collector 42 may be metal sheets, such as corrosion-resistant titanium sheets, having openings formed by etching, drilling, electrical discharge machining, application of electron or laser beams, or stamping.

A surface of the anode-side separator 34 facing the electrolyte membrane-electrode assembly 32 is provided with a first flow path 44, and a surface of the cathode-side separator 36 facing the electrolyte membrane-electrode assembly 32 is provided with a second flow path 46. The first flow path 44 and the second flow path 46 are provided within regions corresponding to respective surface areas of the anode-side current collector 40 and the cathode-side current collector 42. The first flow path 44 and the second flow path 46 are, for example, grooves formed by embossing.

The first flow path 44 communicates with a water supply passage 48 for supplying water (pure water) and also with an oxygen discharge passage 50 for discharging oxygen generated by reactions and used water. The second flow path 46 is provided with a hydrogen discharge passage 52 for discharging hydrogen (high-pressure hydrogen) generated by reactions. The hydrogen discharge passage 52 communicates with a hydrogen communication hole 54 for allowing hydrogen to flow in the direction of arrow A, which is the stacking direction.

Figure 2:
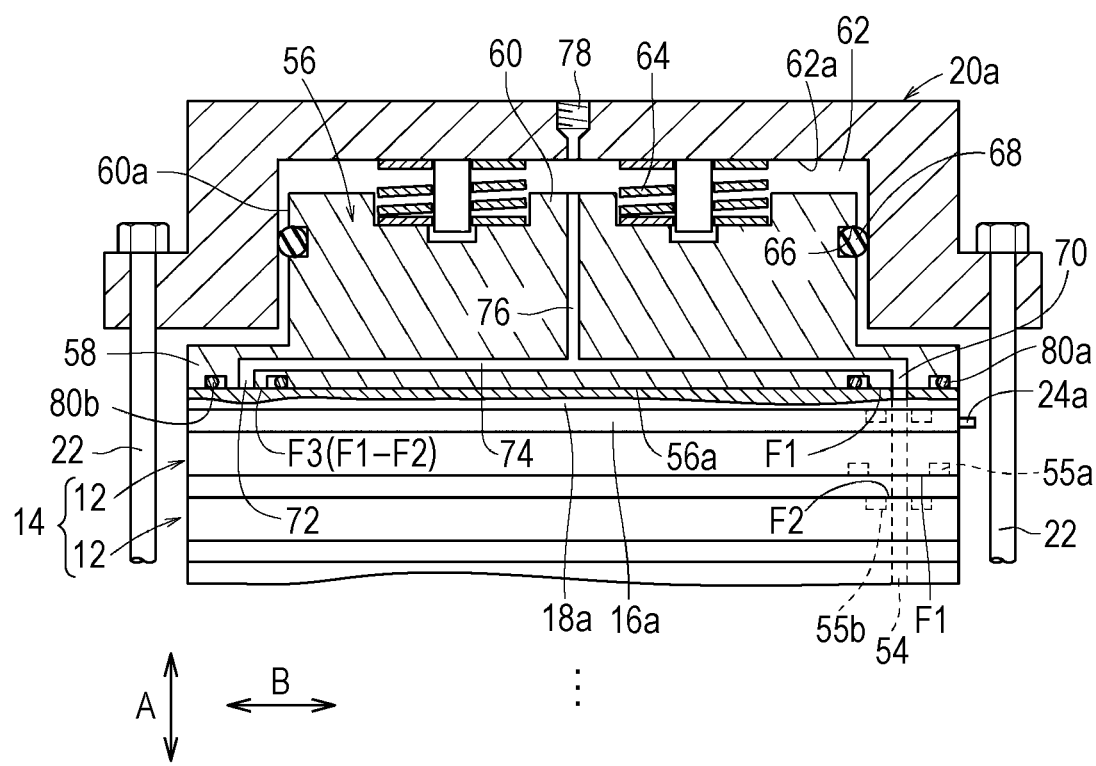
FIG. 2 is a cross-sectional view of a main part of the water electrolysis apparatus.

A surface of the cathode-side separator 36 in contact with the solid polymer electrolyte membrane 38 is provided with a first seal member (e.g., O-ring) 55a around the hydrogen communication hole 54. A surface of the anode-side separator 34 in contact with the solid polymer electrolyte membrane 38 is provided with a second seal member (e.g., O-ring) 55b around the hydrogen communication hole 54. As illustrated in FIG. 2, an area surrounded by the first seal member 55a, that is, an area F1 on which high hydrogen pressure acts is set to be larger than an area F2 surrounded by the second seal member 55b (area F1>area F2).

A piston member 56 is movably provided between the insulating plate 18a and the end plate 20a. The piston member 56 has a piston 60 protruding from a flange 58 in the direction of arrow A. The piston 60 is positioned in a cylinder chamber 62 inside the end plate 20a. Elastic bodies, such as disk springs 64, are interposed between an inner surface 62a of the cylinder chamber 62 and an end portion of the piston 60.

An outer surface 60a of the piston 60 is provided with an outer groove 66. A seal member 68, such as an O-ring, is disposed in the outer groove 66.

The piston member 56 is provided with a first hydrogen passage 70 which opens at an end face (bottom face of the flange 58) 56a facing the cell unit 14 and communicates at one end thereof with the hydrogen communication hole 54. The piston member 56 is also provided with a second hydrogen passage 72 which communicates with the first hydrogen passage 70 and opens at the end face 56a. The first hydrogen passage 70 and the second hydrogen passage 72 communicate with each other through a connecting passage 74 inside the piston member 56.

The connecting passage 74 communicates with a hydrogen lead-out passage 76 for leading hydrogen out of the water electrolysis apparatus 10. The hydrogen lead-out passage 76 extends axially in the center of the piston 60 and communicates with a high-pressure-hydrogen lead-out port 78 in the end plate 20a. The hydrogen lead-out passage 76 may be located off the center of the piston 60, or more than one hydrogen lead-out passage 76 may be provided.

Figure 3:
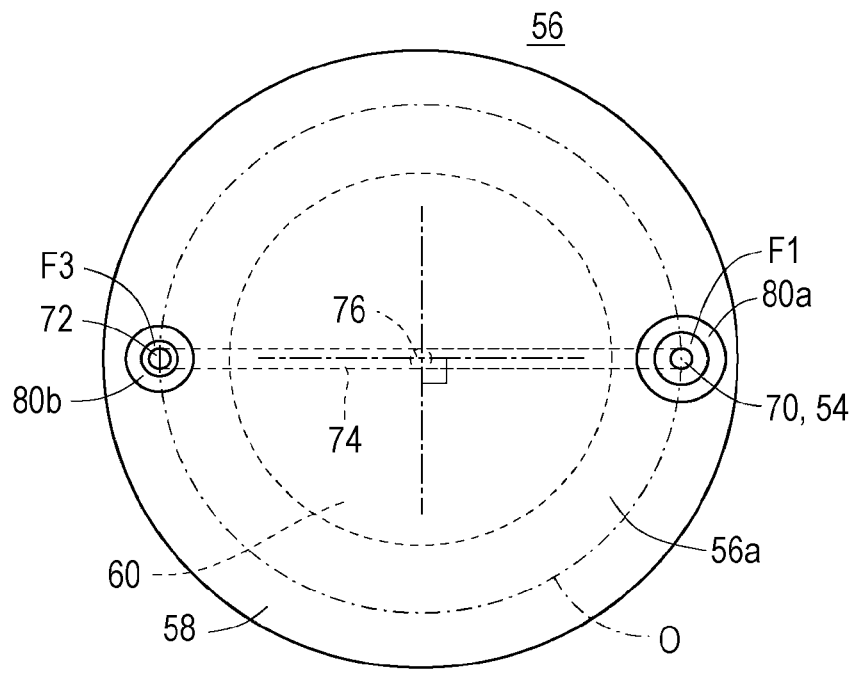
FIG. 3 is a plan view illustrating a piston member of the water electrolysis apparatus, as viewed from an end face of the piston member.

As illustrated in FIG. 3, the first hydrogen passage 70 and the second hydrogen passage 72 are spaced at equal angular intervals of 180° on a virtual circle O centered on the center of the end face 56a. The end face 56a is provided with a third seal member 80a and a fourth seal member 80b surrounding the first hydrogen passage 70 and the second hydrogen passage 72, respectively. An area surrounded by the third seal member 80a, that is, the area F1 on which high hydrogen pressure acts, the area F2 surrounded by the second seal member 55b, and an area F3 surrounded by the fourth seal member 80b have a relationship expressed as "area F1−area F2=area F3".

The cell unit 14 may be provided with a communication hole which communicates with the second hydrogen passage 72 of the piston member 56 in the stacking direction and extends in the direction of arrow A.

An operation of the water electrolysis apparatus 10 configured as described above will now be described.

As illustrated in FIG. 1, water is supplied to the water supply passage 48 in each of the unit cells 12 constituting the water electrolysis apparatus 10 while a voltage is applied thereto from the power supply 28 electrically connected to the terminals 24a and 24b of the terminal plates 16a and 16b. Thus, in each of the unit cells 12, the water is supplied from the water supply passage 48 to the first flow path 44 in the anode-side separator 34 and flows internally along the anode-side current collector 40.

Therefore, the water is electrolyzed in the anode electrode catalyst layer 40a into hydrogen ions, electrons, and oxygen. The hydrogen ions generated by the anode reaction pass through the solid polymer electrolyte membrane 38 to the cathode electrode catalyst layer 42a and combine with the electrons to form hydrogen.

Then, the hydrogen flows along the second flow path 46 between the cathode-side separator 36 and the cathode-side current collector 42. The hydrogen is kept under a pressure higher than that in the water supply passage 48 and hence can be taken out from the hydrogen discharge passage 52 through the hydrogen communication hole 54 to the outside of the water electrolysis apparatus 10.

Referring to FIG. 2, the high-pressure hydrogen led to the hydrogen communication hole 54 passes from the first hydrogen passage 70 in the piston member 56 through the connecting passage 74 to the hydrogen lead-out passage 76, and is introduced into the cylinder chamber 62. Then, through the pressure of the high-pressure hydrogen introduced into the cylinder chamber 62 and the elastic force of the disk springs 64, the piston member 56 presses the cathode-side separators 36 against the electrolyte membrane-electrode assemblies 32 (see FIG. 1). Thus, it is possible to reduce gaps between the solid polymer electrolyte membranes 38 and the corresponding cathode-side current collectors 42, suppress an increase in electrolysis voltage, and effectively reduce the electrolysis voltage.

As illustrated in FIG. 1, oxygen generated by the reaction and used water flow through the first flow path 44. The fluid mixture of oxygen and water is discharged along the oxygen discharge passage 50 to the outside of the water electrolysis apparatus 10. Note that a pressure in the second flow path 46 is higher than that in the first flow path 44.

In this case, in the first embodiment, high-pressure hydrogen generated by water electrolysis flows through the hydrogen communication hole 54 and is introduced into the first hydrogen passage 70 in the piston member 56, and also introduced into the second hydrogen passage 72 communicating with the first hydrogen passage 70 through the connecting passage 74. Thus, through the high-pressure hydrogen introduced into the first hydrogen passage 70 and the second hydrogen passage 72, a hydrogen pressure is applied to the piston member 56 from the direction of the end face 56a facing the cell unit 14.

As illustrated in FIG. 2 and FIG. 3, the first hydrogen passage 70 and the second hydrogen passage 72 are spaced at equal angular intervals on the virtual circle O centered on the center of the end face 56a of the piston member 56. Therefore, since a hydrogen pressure acts on the piston member 56 axially or in the retracting direction, it is possible to reliably prevent the piston member 56 from tilting.

The piston member 56 thus can apply a uniform pressing force to the cell unit 14, improve the performance of applying a stacking load, and maintain good and stable functions.

Additionally, as described above, the area F1 surrounded by the third seal member 80a and the area F3 surrounded by the fourth seal member 80b have a relationship expressed as "area F1–area F2=area F3". Therefore, it is possible to minimize the tilt of the piston member 56 and, for example, prevent the outer surface 60a of the piston 60 from sliding against the inner surface 62a of the cylinder chamber 62 and generating dust.

Also, no external facilities for high-pressure fluid are needed and hence, with a simple and economical structure, the water electrolysis apparatus 10 can reliably apply an appropriate load with the piston member 56.

Figure 4:
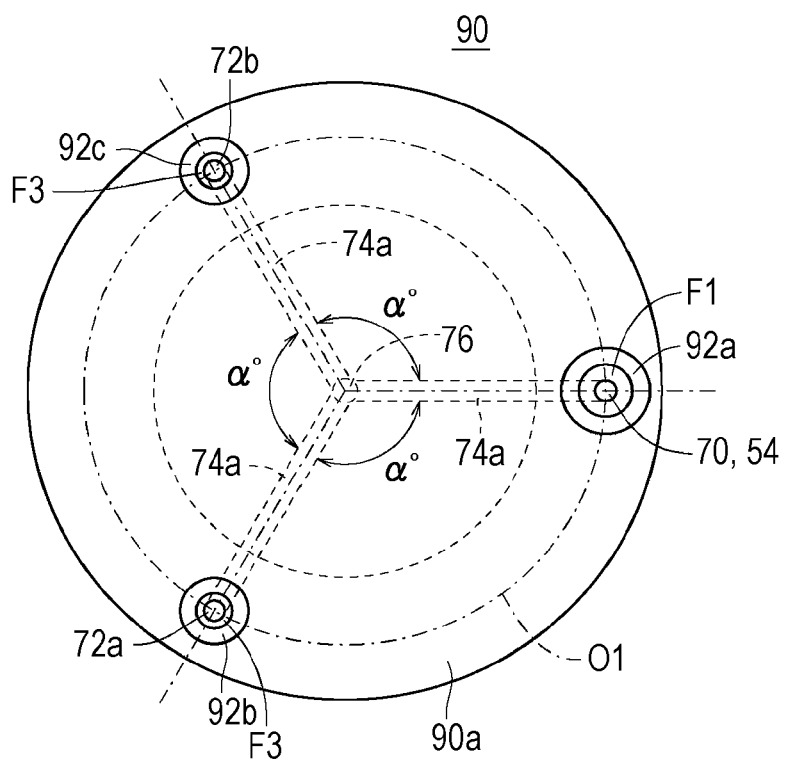
FIG. 4 is a plan view illustrating a piston member of a water electrolysis apparatus according to a second embodiment of the present invention, as viewed from an end face of the piston member.
Figure 5:
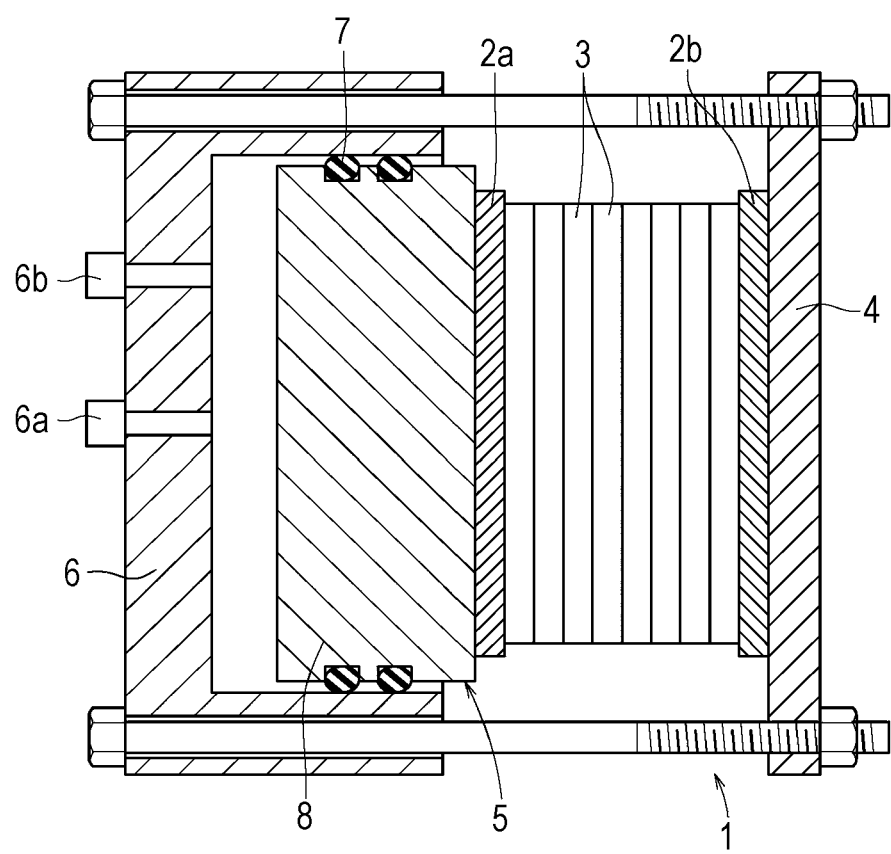
FIG. 5 illustrates a water electrolysis cell disclosed in Japanese Unexamined Patent Application Publication No. 2003-160891.

FIG. 4 is a plan view illustrating a piston member 90 of a water electrolysis apparatus according to a second embodiment of the present invention, as viewed from an end face 90a of the piston member 90. Note that the same components as those of the piston member 56 of the water electrolysis apparatus 10 according to the first embodiment are assigned the same reference numerals and their detailed description will be omitted.

The piston member 90 is provided with two second hydrogen passages 72a and 72b which communicate with the first hydrogen passage 70 and open at the end face 90a. The first hydrogen passage 70 and the second hydrogen passages 72a and 72b communicate with one another through a connecting passage 74a inside the piston member 90. The connecting passage 74a communicates with the hydrogen lead-out passage 76.

The first hydrogen passage 70 and the second hydrogen passages 72a and 72b are spaced at equal angular intervals $\alpha°$, specifically, at equal intervals of 120° on a virtual circle O1 centered on the center of the end face 90a. The end face 90a is provided with a seal member 92a surrounding the first hydrogen passage 70, and seal members 92b and 92c surrounding the second hydrogen passages 72a and 72b, respectively. An area F1 is surrounded by the seal member 92a, and an area F3 is surrounded by each of the seal members 92b and 92c.

In the second embodiment configured as described above, the first hydrogen passage 70 and the second hydrogen passages 72a and 72b are spaced at equal angular intervals on the virtual circle O1 centered on the center of the end face 90a. Therefore, the piston member 90 can smoothly advance and retract axially without tilting, and an effect similar to that of the first embodiment can be achieved.

Although two second hydrogen passages 72a and 72b are provided in the second embodiment, the number of second hydrogen passages is not limited to two. For example, three second hydrogen passages may be provided, in which the first hydrogen passage 70 and the three second hydrogen passages are spaced at equal angular intervals of 90° in an end face of a piston member.

The present invention is also applicable to diaphragm pumps.

According to the embodiment of the present invention, a high-pressure hydrogen producing apparatus includes a cell unit and a retractable piston member. The cell unit is formed by stacking a plurality of unit cells, each having an electrolyte membrane, a first current collector and a second current collector disposed on both sides of the electrolyte membrane, a first separator and a second separator disposed on the first current collector and the second current collector, respectively, a water flow path formed between the first current collector and the first separator to supply water, and a hydrogen flow path formed between the second current collector and the second separator to provide hydrogen generated by electrolyzing the water and having a pressure higher than that of the water. The piston member is configured to apply a pressing force to the cell unit from an end thereof in a stacking direction in which the unit cells are stacked. In the high-pressure hydrogen producing apparatus, a hydrogen communication hole extends in the stacking direction of the unit cells, communicates with the hydrogen flow path, and allows the hydrogen to flow in the stacking direction. The piston member is provided with a first hydrogen passage which opens at an end face of the piston member facing the cell unit and communicates with the hydrogen communication hole, at least one second hydrogen passage which communicates with the first hydrogen passage and opens at the end face, and a hydrogen lead-out passage which communicates with the first hydrogen passage and the second hydrogen passage and leads the hydrogen out of the high-pressure hydrogen producing apparatus. The first hydrogen passage and the second hydrogen passage are spaced at equal angular intervals on a virtual circle centered on the center of the end face.

In the high-pressure hydrogen producing apparatus described above, the first hydrogen passage and the second hydrogen passage may communicate with the hydrogen lead-out passage through a connecting passage inside the piston member.

In the embodiment of the present invention, high-pressure hydrogen generated by water electrolysis flows through the hydrogen communication hole and is introduced into the first hydrogen passage in the piston member, and also introduced into the second hydrogen passage communicating with the first hydrogen passage. Thus, through the high-pressure hydrogen introduced into the first hydrogen passage and the second hydrogen passage, a hydrogen pressure is applied to the piston member from the direction of the end face facing the cell unit.

As described above, the first hydrogen passage and the second hydrogen passage are spaced at equal angular intervals on the virtual circle centered on the center of the end face of the piston member. Therefore, since a hydrogen pressure acts on the piston member axially or in the retracting direction, it is possible to reliably prevent the piston member from tilting.

The piston member thus can apply a uniform pressing force to the cell unit, improve the performance of applying a stacking load, and maintain good and stable functions. Additionally, no external facilities for high-pressure fluid are needed and hence, with a simple and economical structure, the high-pressure hydrogen producing apparatus can reliably apply an appropriate load with the piston member.

Obviously, numerous modifications and variations of the present invention are possible in light of the above teachings. It is therefore to be understood that within the scope of the appended claims, the invention may be practiced otherwise than as specifically described herein.

What is claimed is:

1. A high-pressure hydrogen producing apparatus comprising:
    a cell device provided by stacking a plurality of unit cells, each of the plurality of unit cells comprising:
        an electrolyte membrane;
        a first current collector;
        a second current collector, the first and second current collectors being disposed on both sides of the electrolyte membrane;
        a first separator disposed on the first current collector;
        a second separator disposed on the second current collector;
        a water flow path provided between the first current collector and the first separator to supply water; and
        a hydrogen flow path provided between the second current collector and the second separator to provide hydrogen which is generated by electrolyzing the water and which has a pressure higher than a pressure of the water; and
    a piston member to apply a pressing force to the cell device from an end of the piston member in a stacking direction in which the unit cells are stacked, wherein
    a hydrogen communication hole extends in the stacking direction of the unit cells, communicates with the hydrogen flow path, and allows the hydrogen to flow in the stacking direction,
    the piston member is provided with
        a first hydrogen passage which opens at an end face of the piston member facing the cell device and which communicates with the hydrogen communication hole,
        at least one second hydrogen passage which communicates with the first hydrogen passage and which opens at the end face of the piston member facing the cell device, and
        a hydrogen lead-out passage which communicates with the first hydrogen passage and the second hydrogen passage and which leads the hydrogen out of the high-pressure hydrogen producing apparatus,
    an opening of the first hydrogen passage and an opening of the second hydrogen passage are spaced at substantially equal angular intervals on a virtual circle centered on a center of the end face of the piston member, and
    the first hydrogen passage and the second hydrogen passage extend in a moving direction of a piston of the piston member.

2. The high-pressure hydrogen producing apparatus according to claim 1, wherein the first hydrogen passage and the second hydrogen passage communicate with the hydrogen lead-out passage through a connecting passage inside the piston member.

3. The high-pressure hydrogen producing apparatus according to claim 1, further comprising:
    an urging member to urge the piston member to the cell device in the stacking direction.

4. A high-pressure hydrogen producing apparatus comprising:
    a cell device provided by stacking a plurality of unit cells, each of the plurality of unit cells comprising:
        an electrolyte membrane;
        a first current collector;
        a second current collector, the first and second current collectors being disposed on opposite sides of the electrolyte membrane;
        a first separator disposed on the first current collector;
        a second separator disposed on the second current collector;
        a water flow path provided between the first current collector and the first separator to supply water; and
        a hydrogen flow path provided between the second current collector and the second separator to provide hydrogen which is generated by electrolyzing the water and which has a pressure higher than a pressure of the water; and
    a piston member configured to apply a pressing force to the cell device from an end of the piston member in a stacking direction in which the unit cells are stacked,
    wherein the cell device includes a hydrogen communication hole that extends in the stacking direction of the unit cells, and communicates with the hydrogen flow path,
    wherein the piston member comprises:

a first hydrogen passage that extends within the piston member and has a first opening on an end face of the piston member, the first opening communicating with the hydrogen communication hole;

a second hydrogen passage that extends within the piston member and has a second opening of the end face of the piston member, the second hydrogen passage communicating with the first hydrogen passage; and a hydrogen lead-out passage that extends within the piston member, that communicates with the first hydrogen passage and the second hydrogen passage, and that is configured to lead the hydrogen out of the high-pressure hydrogen producing apparatus, wherein the first hydrogen passage and the second hydrogen passage are spaced at substantially equal angular intervals on a virtual circle centered on a center of the end face of the piston member, and wherein the first hydrogen passage and the second hydrogen passage extend in a moving direction of a piston of the piston member.

5. The high-pressure hydrogen producing apparatus according to claim 4, wherein the first hydrogen passage and the second hydrogen passage communicate with the hydrogen lead-out passage through a connecting passage inside the piston member.

6. The high-pressure hydrogen producing apparatus according to claim 4, further comprising:

an urging member configured to urge the piston member to the cell device in the stacking direction.

7. The high-pressure hydrogen producing apparatus according to claim 4, wherein the first opening and the second opening are spaced at substantially equal angular intervals on the virtual circle centered on the center of the end face of the piston member.

8. The high-pressure hydrogen producing apparatus according to claim 4, wherein the piston is movable in the stacking direction of the unit cells, and wherein the hydrogen communication hole communicates with a non-center part of the piston.

9. The high-pressure hydrogen producing apparatus according to claim 4, wherein the hydrogen lead-out passage extends within the piston in a moving direction of the piston along a center axis of the piston.

10. The high-pressure hydrogen producing apparatus according to claim 1, wherein the piston is movable in the stacking direction of the unit cells, and wherein the hydrogen communication hole communicates with a non-center part of the piston.

11. The high-pressure hydrogen producing apparatus according to claim 1, wherein the hydrogen lead-out passage extends within the piston in a moving direction of the piston along a center axis of the piston.

\* \* \* \* \*